(12) United States Patent
Zhao

(10) Patent No.: US 10,437,122 B2
(45) Date of Patent: Oct. 8, 2019

(54) DISPLAY DEVICE, ARRAY SUBSTRATE, PIXEL STRUCTURE, AND MANUFACTURING METHOD THEREOF

(71) Applicant: BOE TECHNOLOGY GROUP CO., LTD., Beijing (CN)

(72) Inventor: Lijun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 431 days.

(21) Appl. No.: 14/379,259

(22) PCT Filed: Dec. 11, 2013

(86) PCT No.: PCT/CN2013/089147
§ 371 (c)(1),
(2) Date: Aug. 15, 2014

(87) PCT Pub. No.: WO2015/024332
PCT Pub. Date: Feb. 26, 2015

(65) Prior Publication Data
US 2016/0062199 A1 Mar. 3, 2016

(30) Foreign Application Priority Data
Aug. 19, 2013 (CN) .......................... 2013 1 0362394

(51) Int. Cl.
*G02F 1/1339* (2006.01)
*G02F 1/1343* (2006.01)
(Continued)

(52) U.S. Cl.
CPC .... *G02F 1/136227* (2013.01); *G02F 1/13439* (2013.01); *G02F 1/136209* (2013.01);
(Continued)

(58) Field of Classification Search
CPC ... G02F 1/136209; G02F 2001/136222; G02F 1/133345; G02F 1/133512; H01L 27/1248;
(Continued)

(56) References Cited

U.S. PATENT DOCUMENTS 9,316,855 B2 * 4/2016 Nagami ............ G02F 1/133345
9,515,100 B2 * 12/2016 Im ..................... H01L 21/02532
(Continued)

FOREIGN PATENT DOCUMENTS

CN 101149542 A 3/2008
CN 101414082 A 4/2009
(Continued)

OTHER PUBLICATIONS

International Search Report dated May 23, 2014 PCT/CN2013/089147.
(Continued)

*Primary Examiner* — Bradley Smith
*Assistant Examiner* — David J Goodwin

(57) ABSTRACT

A display device, an array substrate, a pixel structure and a manufacturing method thereof are disclosed, and the pixel structure comprises a thin film transistor (101) and a first electrode (102) configured to form an electric field, the pixel structure further comprises a black matrix layer (103), and the black matrix layer (103) is located between the thin film transistor (101) and the first electrode (102). In the display device, the array substrate, the pixel structure and the manufacturing method, the black matrix layer is formed on the surface of the thin film transistor of the pixel structure, which simplifies the processes, saves materials, improves aperture ratio, and reduces parasitic capacitance between the common electrode and the data line to decrease the power consumption of the device.

11 Claims, 5 Drawing Sheets

(51) Int. Cl.
*G02F 1/1362* (2006.01)
*G02F 1/1333* (2006.01)

(52) U.S. Cl.
CPC .. *G02F 1/136286* (2013.01); *G02F 1/133345* (2013.01); *G02F 2001/134372* (2013.01); *G02F 2001/136295* (2013.01); *G02F 2201/40* (2013.01)

(58) Field of Classification Search
CPC ........... H01L 27/1214; H01L 29/78633; H01L 27/3272
See application file for complete search history.

(56) References Cited

U.S. PATENT DOCUMENTS

| | | | |
|---|---|---|---|
| 2002/0085140 A1 | 7/2002 | Ko | |
| 2005/0140875 A1* | 6/2005 | Jeoung | G02F 1/133555 349/114 |
| 2007/0013839 A1* | 1/2007 | Rho | G02B 5/201 349/114 |
| 2009/0102994 A1 | 4/2009 | Oh et al. | |
| 2010/0003774 A1* | 1/2010 | Liao | G02F 1/136209 438/29 |
| 2010/0003792 A1* | 1/2010 | Lai | G02F 1/136209 438/160 |
| 2011/0025967 A1* | 2/2011 | Sohn | G02F 1/133711 349/124 |
| 2011/0284854 A1* | 11/2011 | Endo | H01L 29/4908 257/59 |
| 2012/0320295 A1* | 12/2012 | Nagami | G02F 1/133345 349/43 |
| 2014/0054581 A1 | 2/2014 | Song et al. | |

FOREIGN PATENT DOCUMENTS

| | | |
|---|---|---|
| CN | 102681276 A | 9/2012 |
| KR | 20090083077 A | 8/2009 |

OTHER PUBLICATIONS

International Preliminary Report on Patentability Appln. No. PCT/CN2013/089147; dated Feb. 23, 2016.
Second Chinese Office Action Appln. No. 201310362394.0; dated Jan. 5, 2016.

* cited by examiner

DISPLAY DEVICE, ARRAY SUBSTRATE, PIXEL STRUCTURE, AND MANUFACTURING METHOD THEREOF

CROSS REFERENCE TO RELATED APPLICATIONS

This application is based on International Application No. PCT/CN2013/089147 filed on Dec. 11, 2013, which claims priority to Chinese National Application No. 201310362394.0 filed on Aug. 19, 2013. The entire contents of each and every foregoing application are incorporated herein by reference.

TECHNICAL FIELD

Embodiments of the present invention relate to a display device, an array substrate, a pixel structure, and a manufacturing method thereof.

BACKGROUND

In recent years, with the development of the science and technology, liquid crystal display technology continues to advance. Thin Film Transistor-Liquid Crystal Displays (TFT-LCDs) occupy an important position in the field of display because of their advantages such as good image display quality, low energy consumption, environmental protection, and so on.

In the procedure of manufacturing a display, generally, a black matrix layer and a common electrode layer are formed on a color filter substrate, a thin film transistor is formed on an array substrate, and a passivation layer and a pixel electrode layer are formed on the surface of the thin film transistor; but the processes of this manufacturing method are relatively complex. Besides, because of the error in the cell-assembly of a color filter substrate and an array substrate, it is generally necessary to form the black matrix layer relatively wide, which affects the aperture ratio of pixel.

SUMMARY

An embodiment of the present invention provides a pixel structure, which comprises a thin film transistor and a first electrode configured to form an electric field; the pixel structure further comprises a black matrix layer, and the black matrix layer is provided between the thin film transistor and the first electrode.

Another embodiment of the present invention provides a manufacturing method of a pixel structure, which comprises: forming a thin film transistor on a substrate; forming a black matrix layer on the thin film transistor; and forming a first electrode on the black matrix layer.

Another embodiment of the present invention provides a manufacturing method of a pixel structure, which comprises: forming a thin film transistor on a substrate; forming a black matrix layer on the thin film transistor; forming a second electrode on the black matrix layer, and connecting the second electrode with a drain electrode of the thin film transistor; forming a first insulating layer on the second electrode; and forming a first electrode on the first insulating layer.

Another embodiment of the present invention provides a manufacturing method of a pixel structure, which comprises: forming a thin film transistor on a substrate, and forming a third electrode at the same time of forming a gate electrode of the thin film transistor; forming a black matrix layer on the thin film transistor; and forming a first electrode on the black matrix layer, and connecting the first electrode with a drain electrode of the thin film transistor.

Another embodiment of the present invention provides an array substrate, which comprises: a gate line, a data line and a pixel structure surrounded by the gate line and the data line; and the pixel structure is the above pixel structure.

Another embodiment of the present invention provides a display device, which comprises the above array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Embodiments of the present invention provide a display device, an array substrate, a pixel structure, and a manufacturing method thereof, which can simplify the manufacturing processes of the pixel structure, improve the aperture ratio, and reduce the power consumption of the display device.

A pixel structure provided by an embodiment of the present invention will be described as follows with reference to FIG. 1.

Figure 1:
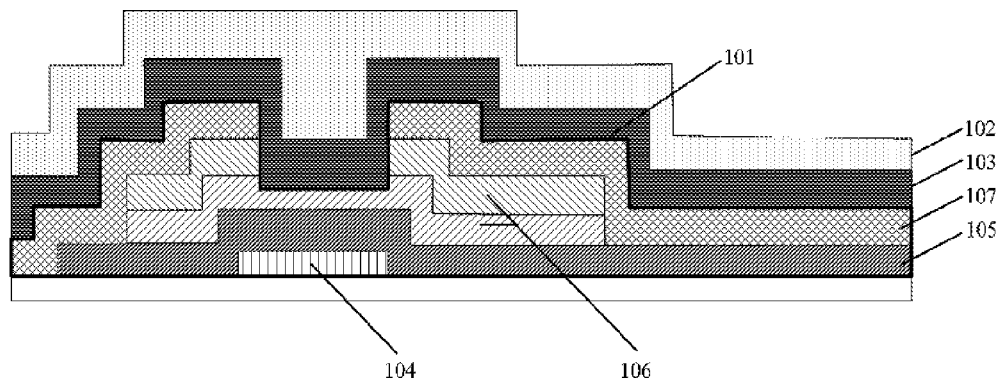
FIG. 1 is a cross-sectional view of a pixel structure provided by an embodiment of the present invention.

In an embodiment of the present invention, as illustrated by FIG. 1, the pixel structure comprises a thin film transistor 101 (the region surrounded by dark black real lines in FIG. 1) and a first electrode 102 used to form an electric field; the pixel structure further comprises a black matrix layer 103, and the black matrix layer 103 is located between the thin film transistor 101 and the first electrode 102.

Specifically, the pixel structure from bottom to top comprises a gate electrode 104, a second insulating layer 105 formed on the gate electrode 104, an active layer 106 formed on the second insulating layer 105, and a source drain electrode layer 107 formed on the active layer 106; the source drain metal layer 107 forms a source electrode and a drain electrode; the gate electrode 104, the second insulating layer 105, the active layer 106, and the source drain metal layer 107 together form a thin film transistor 101, the thin film transistor 101 is provided with a black matrix layer 103 thereon, and the black matrix layer 103 is provided with a first electrode layer 102 thereon. In the embodiment of the present invention, the second insulating layer may be a gate insulating layer, and the active layer may comprise a semiconductor layer and a doped semiconductor layer.

Figure 7:
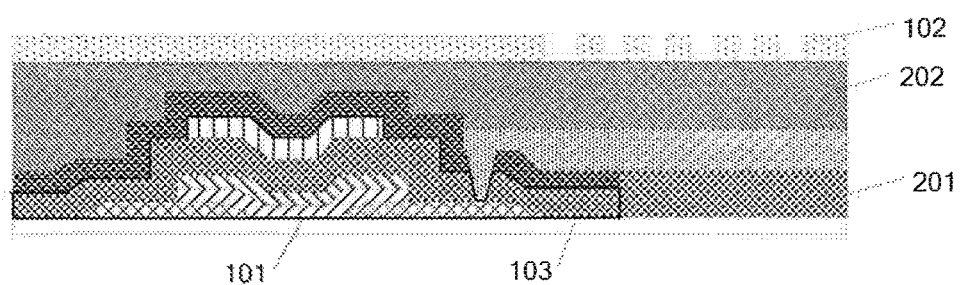
FIG. 7 is a cross-sectional view of a pixel structure provided by another embodiment of the present invention.

Furthermore, as illustrated in FIG. 7, the pixel structure may also from bottom to top comprise a source electrode, a drain electrode, an active layer, a second insulating layer, a gate electrode, and a black matrix is formed on the gate electrode. In the embodiment of the present invention, the pixel structure is not limited to the above, and those skilled in the art can make selections and variations according to the requirement.

It should be noted that the orientation represented by the top and bottom in "from bottom to top" described in the present embodiment are that the bottom refers to the position close to the substrate, and the top refers to the position away from the substrate.

In the present embodiment, the black matrix layer generally formed on a color filter layer is formed on a surface of the thin film transistors of the pixel structure and replaces an original PVX passivation layer, so that the steps of forming the PVX passivation layer is reduced and the processes are simplified. Besides, because the black matrix is formed on an array substrate, the influence on the aperture ratio of the error in the cell-assembly of the color filter substrate and the array substrate is avoided, so that the aperture ratio and light transmission ratio can be increased. Furthermore, the black matrix layer is formed on the array substrate, which increases the distance between the common electrode and the data line and reduces the parasitic capacitance between the common electrode and the data line, thus the power consumption is reduced.

A pixel structure provided by another embodiment of the present invention will be described as follows with reference to FIG. 2.

Figure 2:
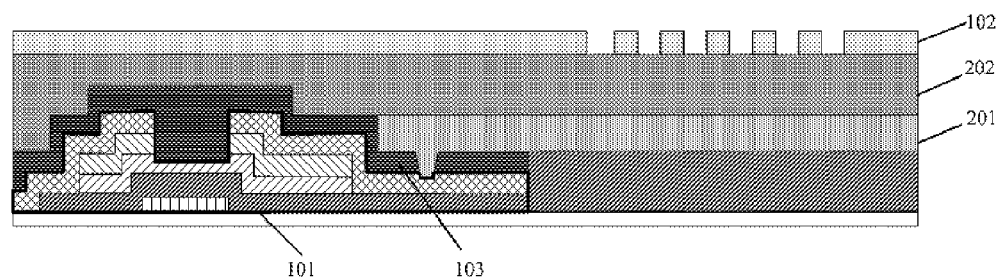
FIG. 2 is a cross-sectional view of a pixel structure provided by another embodiment of the present invention.

In an embodiment of the present invention, as illustrated by FIG. 2, the pixel structure further comprises a second electrode 201 and a first insulating layer 202; the second electrode 201 is formed on a black matrix layer 103; the black matrix layer 103 is formed on a thin film transistor 101; the first insulating layer 202 is formed between the second electrode 201 and the first electrode 102; the first insulating layer 202 is a pixel electrode insulating layer; the second electrode 201 is connected with a drain electrode of the thin film transistor 101. The second electrode 201 is a pixel electrode, and the first electrode 102 is a common electrode; the pixel electrode may be a plate or slit-like electrode, the common electrode is a slit-like electrode, and the pixel electrode and the common electrode form an electric field therebetween. Certainly, in some embodiments of the present invention, the upper and lower order of the pixel electrode and the common electrode may be inversed, i.e., the second electrode is the common electrode, and the first electrode is the pixel electrode, but the upper pixel electrode is a slit-like electrode, the lower common electrode is a plate or slit-like electrode; and the pixel electrode is connected with the drain electrode of the thin film transistor.

A pixel structure provided by another embodiment of the present invention will be described as follows with reference to FIG. 3.

Figure 3:
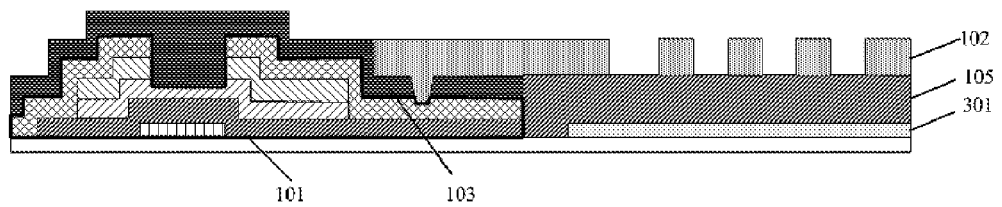
FIG. 3 is a cross-sectional view of a pixel structure provided by another embodiment of the present invention.

In an embodiment of the present invention, as illustrated by FIG. 3, the pixel structure further forms a third electrode 301 used to form an electric field with a first electrode 102 at the same time of forming a gate electrode of a thin film transistor; and the first electrode 102 is connected with a drain electrode of the thin film transistor 101. The third electrode 301 and the first electrode 102 are provided with a second insulating layer 105 therebetween. Here, the second insulating layer 105 is a gate insulating layer; the third electrode 301 is a pixel electrode; the first electrode 102 is a common electrode, the pixel electrode may a plate or slit-like electrode, and the common electrode is a slit-like electrode. Certainly, in some embodiments of the present invention, the upper and lower order of the pixel electrode and the common electrode can be inversed, i.e., the third electrode is the common electrode, the first electrode is the pixel electrode, but the upper pixel electrode is slit-like electrode and the lower common electrode is a plate or slit-like electrode; and the pixel electrode is connected with the drain electrode of the thin film transistor.

Hereafter, the manufacturing method of the pixel structure provided by the embodiments of the present invention will be described.

Figure 4A:
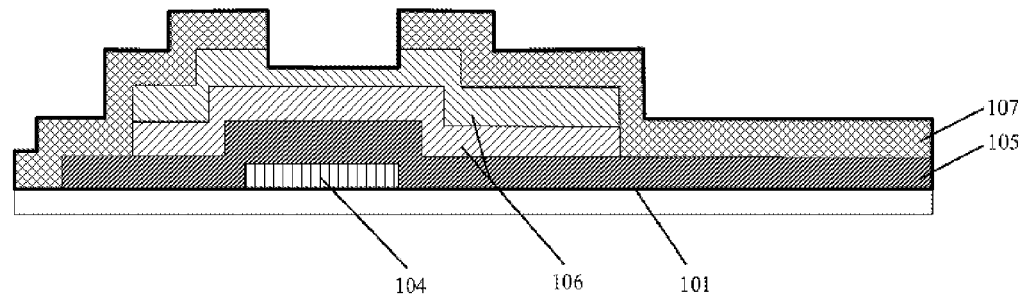
FIGS. 4a~4c are cross-sectional views of every steps of the manufacturing method of a pixel structure provided by an embodiment of the present invention.
Figure 4B:
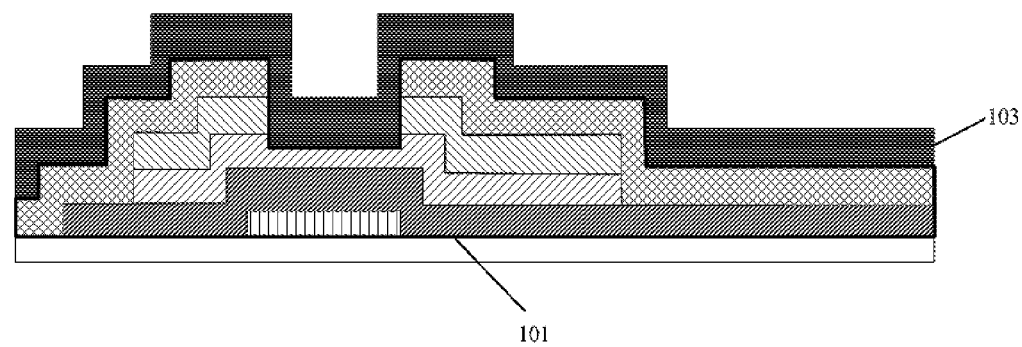
Figure 4C:
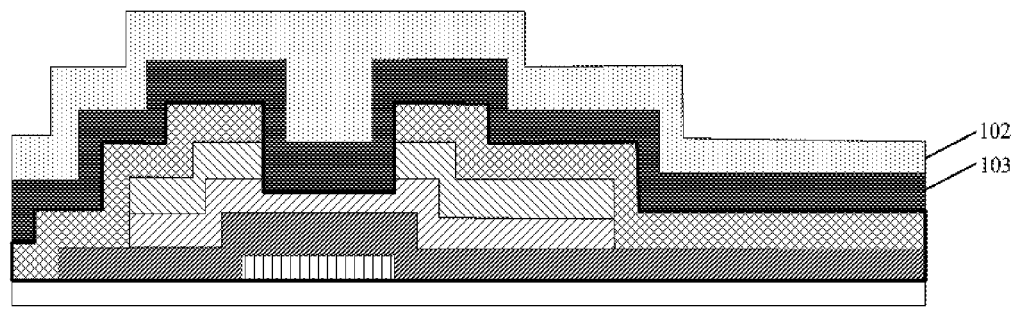

FIGS. 4a~4c are cross-sectional views of every steps of the manufacturing method of a pixel structure provided by an embodiment of the present invention, and FIGS. 4a~4c respectively correspond to steps S1~S3. The method comprises the following steps.

S1, forming a thin film transistor on a substrate.

As illustrated by FIG. 4a, the thin film transistor 101 comprises a gate electrode 104, a second insulating layer 105, an active layer 106, and a source drain metal layer 107. In the procedure of formation, the formation of a channel structure of the thin film transistor comprises: firstly, coating a layer of photoresist on the source drain metal layer, removing the photoresist in the region to form the channel structure after exposure and development by a mask plate, and forming the channel structure on the active layer and the source drain metal layer by an etching process. In the embodiment of the present invention, the processes of forming the thin film transistor 101 may be same as the conventional technology, which will not be repeated here.

S2, forming a black matrix layer 103 on the thin film transistor 101.

As illustrated by FIG. 4b, a black matrix 103 is deposited on the thin film transistor 101, and the black matrix layer 103 covers the whole upper surface of the thin film transistor; the black matrix is formed to replace a passivation (PVX) layer in the conventional technology, which decreases the processes and reduces the costs.

S3, forming a first electrode layer 102 on the black matrix layer 103.

As illustrated by FIG. 4c, a first electrode layer 102 is formed on the black matrix layer 103 by a mask process.

Figure 5A:
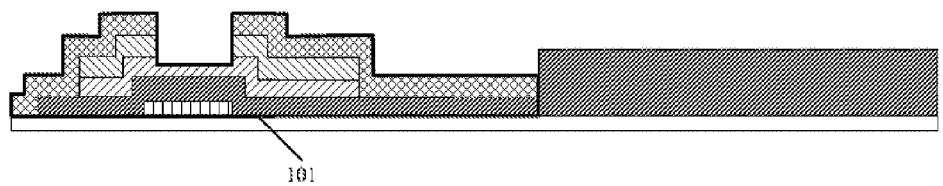
FIGS. 5a.about.5e are cross-sectional views of every steps of the manufacturing method of a pixel structure provided by an embodiment of the present invention.
Figure 5B:
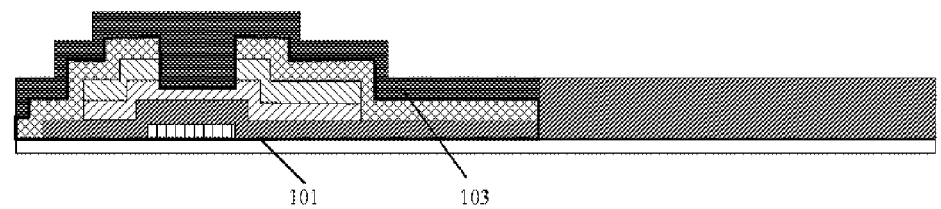
Figure 5C:
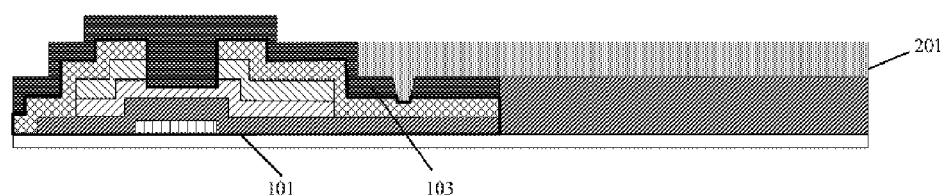
Figure 5D:
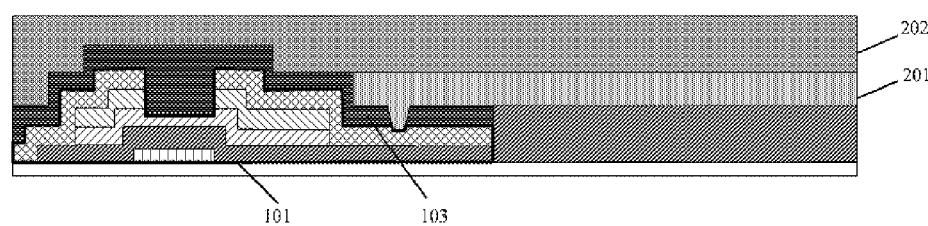
Figure 5E:
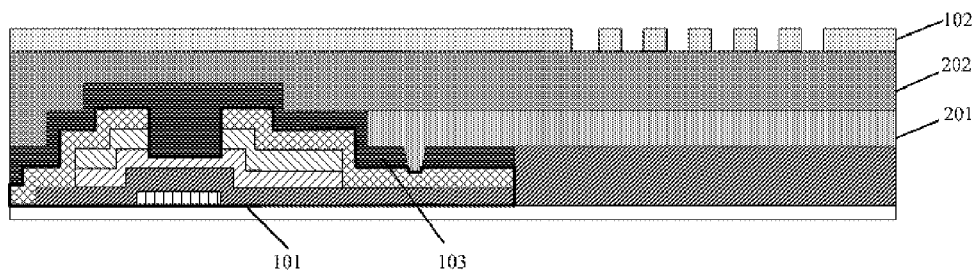

FIGS. 5a~5e are cross-sectional views of every steps of the manufacturing method of a pixel structure provided by an embodiment of the present invention, and FIGS. 5a~5c respectively correspond to steps A1~A5. The method comprises the following steps.

A1, forming a thin film transistor 101 on a substrate.

A2, forming a black matrix layer 103 on the thin film transistor 101.

In the embodiment of the present invention, the method of forming the thin film transistor and the black matrix is same as the manufacturing method of the above-mentioned pixel structure, which will not be repeated here.

A3, forming a second electrode 201 on the black matrix layer 103, connecting the second electrode 201 with a drain electrode of the thin film transistor.

A4, forming a first insulating layer 202 on the second electrode 201.

A5, forming a first electrode 102 on the first insulating layer 202.

In the embodiment of the present invention, the first electrode is a common electrode, the second electrode is a pixel electrode, and the second electrode is connected with a drain electrode of the thin film transistor through a via hole. For example, the first electrode may be formed as a slit-like electrode, and the second electrode may be formed as a plate-like electrode; or, both the first electrode and the second electrode are formed as slit-like electrodes; those skilled in the art can make selections or variations according to requirements.

Figure 6A:
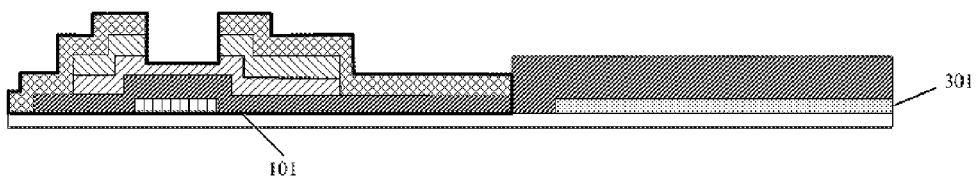
FIGS. 6a.about.6c are cross-sectional views of every steps of the manufacturing method of a pixel structure provided by an embodiment of the present invention.
Figure 6B:
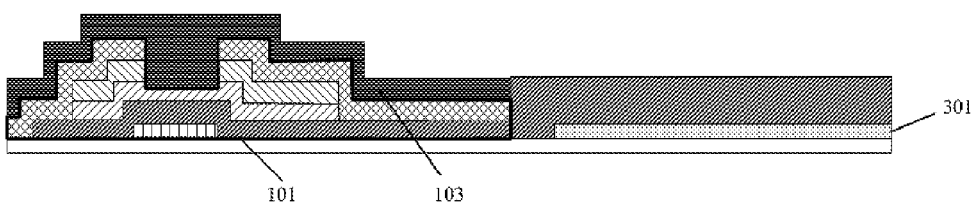
Figure 6C:
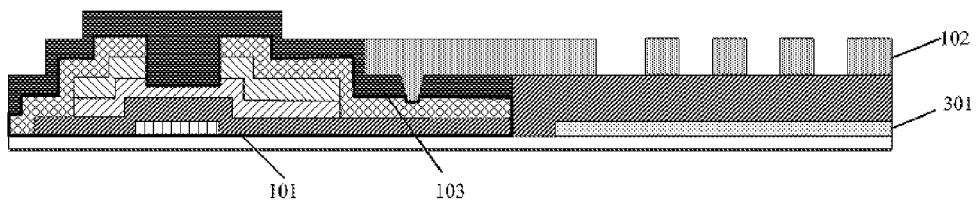

FIGS. 6a~6c are cross-sectional views of every steps of the manufacturing method of a pixel structure provided by an embodiment of the present invention, and FIGS. 6a~6c respectively correspond to steps B1~B3. The method comprises the following steps.

B1, forming a thin film transistor 101 on a substrate, and forming a third electrode 301 at the same time of forming a gate electrode of the thin film transistor.

B2, forming a black matrix layer 103 on the thin film transistor 101.

B3, forming a first electrode 102 on the black matrix layer 103, and connecting the first electrode 102 with a drain electrode of the first electrode.

Figure 8:
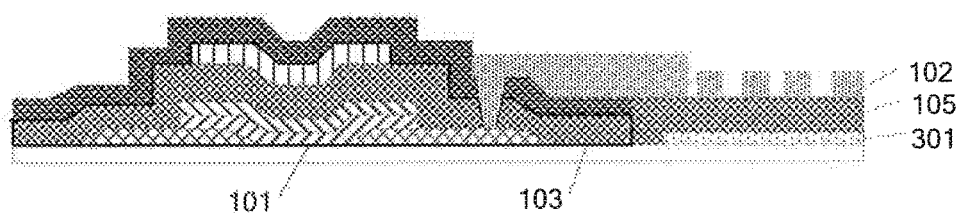
FIG. 8 is a cross-sectional view of a pixel structure provided by another embodiment of the present invention.

In the embodiment of the present invention, as illustrated by FIG. 8, the first electrode is a pixel electrode, and the third electrode is a common electrode. The first electrode is connected with the drain electrode through a via hole. For example, the first electrode is a slit-like electrode, and the third electrode is a plate-like electrode; or, both the first electrode and the third electrode are slit-like electrodes; those skilled in the art can make selections or variations according to requirements.

In the present embodiment, the black matrix layer which is generally formed on a color filter substrate is formed on the surface of the thin film transistor of the pixel structure and replaces the original passivation (PVX) layer, which reduces one step of mask process with regard to the conventional technology and simplifies the processes. Besides, the influence on the aperture ratio of the error in the cell-assembly of the color filter substrate and the array substrate can be avoided by forming the black matrix layer which is generally formed on a color filter substrate on an array substrate, so the aperture ratio and light transmission ratio can be improved. Furthermore, the black matrix layer is formed on the array substrate, which can also reduce the parasitic capacitance between the common electrode and the data line, so the power consumption of the device is reduced.

An embodiment of the present invention further provides an array substrate, the array substrate comprises a gate line, a data line, and a pixel structure surrounded by the gate line and the data line, the pixel structure is a pixel structure as described by the above embodiments, and the gate line and the data line are provided with a black matrix layer thereon.

An embodiment of the present invention further provides a display device, and the display device comprises an array substrate as described by the above embodiments.

The embodiments above are used to illustrate the technical solutions of the present invention and not limitative to the present invention; although the foregoing embodiments illustrate the present invention in detail, one skilled in the art shall understand that: one skilled in the art could amend the technical solutions recorded in the foregoing each embodiment, or replace partial technical features equally; however, those amendments or replacements do not make the substance of the corresponding technical solutions go out the scope and the spirit of the technical solutions of each embodiment of the present invention.

The invention claimed is:

1. A pixel structure comprising a thin film transistor and a first electrode configured to form an electric field;
   wherein the pixel structure further comprises a black matrix layer, a second electrode and a first insulating layer, and the black matrix layer is located between the thin film transistor and the first electrode;
   the first insulating layer is formed on the second electrode; the first electrode is formed on the first insulating layer; the second electrode is connected with a drain electrode of the thin film transistor through a via hole; the via hole penetrates the black matrix layer and extends into the drain electrode; the via hole does not penetrate the drain electrode; and a surface of the second, electrode in direct contact with the drain electrode is not at a same layer as a surface of the black matrix in direct contact with the drain electrode.

2. A pixel structure comprising a thin film transistor and a first electrode configured to form an electric field;
   wherein the pixel structure further comprises a black matrix layer and a second electrode that is configured to form an electric field with the first electrode and formed at the same time of forming a gate electrode of the thin film transistor, and the black matrix layer is located between the thin film transistor and the first electrode;
   the first electrode is connected with a drain electrode of the thin film transistor through a via hole; the via hole penetrates the black matrix layer and extends into the drain electrode; the via hole does not penetrate the drain electrode; and a surface of the second electrode in direct contact with the drain electrode is not at a same layer as a surface, of the black matrix in direct contact with the drain electrode.

3. The pixel structure according to claim 1, wherein the first electrode is a slit-like electrode, and the second electrode is a plate-like electrode; or, both the first electrode and the second electrode are slit-like electrodes.

4. The pixel structure according to claim 2, wherein the first electrode is a slit-like electrode, and the second electrode is a plate-like electrode; or, both the first electrode and the second electrode are slit-like electrodes.

5. The pixel structure according to claim 1, wherein the structure of the thin film transistor from bottom to top comprises: a gate electrode, a second insulating layer, an active layer, a source electrode and a drain electrode; and the source electrode and the drain electrode are provided with the black matrix layer thereon.

6. The pixel structure according to claim 1, wherein the structure of the thin film transistor from bottom to top comprises: a source electrode, a drain electrode, an active layer, a second insulating layer and a gate electrode; and the gate electrode is provided with the black matrix layer thereon.

7. A manufacturing method of the pixel structure according to claim 1, comprising:

forming a thin film transistor on a substrate;
forming a black matrix layer on the thin film transistor;
forming a second electrode on the black matrix layer and connecting the second electrode with a drain electrode of the thin film transistor through a via hole;
forming a first insulating layer on the second electrode; and
forming a first electrode on the black matrix layer and on the first insulating layer;
wherein the black matrix layer is located between the thin film transistor and the first electrode; the via hole penetrates the black matrix layer and extends into the drain electrode; the via hole does not penetrate the drain electrode; and a surface of the second electrode in direct contact with the drain electrode is not at a same layer as a surface of the black matrix in direct contact with the drain electrode.

8. A manufacturing method of the pixel structure according to claim 2, comprising:
forming a thin film transistor on a substrate;
forming a black matrix layer on the thin film transistor;
forming a first electrode on the black matrix layer and connecting the first electrode with a drain electrode of the thin film transistor through a via hole;
forming a second electrode at the same time of forming a gate electrode of the thin film transistor;
wherein the black matrix layer is located between the thin film transistor and the first electrode; the via hole penetrates the black matrix layer and extends into the drain electrode; the via hole does not penetrate the drain electrode; and a surface of the second electrode in direct contact with the drain electrode is not at a same layer as a surface of the black matrix in direct contact with the drain electrode.

9. An array substrate comprising a gate line, a data line and a pixel structure surrounded by the gate line and the data line,
wherein the pixel structure is the pixel structure as claimed by claim 1.

10. The array substrate according to claim 9, wherein the gate line and the data line are provided with the black matrix layer thereon.

11. The pixel structure according to claim 2, wherein the structure of the thin film transistor from bottom to top comprises: a gate electrode, a second insulating layer, an active layer, a source electrode and a drain electrode; and the source electrode and the drain electrode are provided with the black matrix layer thereon.

\* \* \* \* \*